United States Patent

Bov, Jr. et al.

[11] Patent Number: 5,414,783
[45] Date of Patent: May 9, 1995

[54] WRITE HEAD FOR A MICR READER HAVING AN ADJUSTABLE FIELD PROFILE

[75] Inventors: Raphael F. Bov, Jr., Pittsford; Jose R. Diaz, Webster, both of N.Y.

[73] Assignee: Xerox Corporation, Stamford, Conn.

[21] Appl. No.: 125,722

[22] Filed: Sep. 24, 1993

[51] Int. Cl.⁶ .......................... G06K 7/08; G11B 5/23; H01F 3/00
[52] U.S. Cl. .......................... 382/320; 382/135; 235/450; 360/119; 335/298
[58] Field of Search .......................... 382/7, 64, 11, 12; 235/449, 450; 360/125, 126, 127, 119; 335/237, 298, 306, 236, 288

[56] References Cited

U.S. PATENT DOCUMENTS

| | | | |
|---|---|---|---|
| 2,850,581 | 9/1958 | Gratian | 360/125 |
| 3,417,356 | 12/1968 | Tschopp | 335/298 |
| 3,546,398 | 12/1970 | French | 360/119 |
| 3,890,582 | 6/1975 | Jeong | 333/24.2 |
| 4,423,451 | 12/1983 | Chi | 360/125 |
| 4,804,879 | 2/1989 | Fukumoto | 313/361.1 |
| 4,922,086 | 5/1990 | Milford | 235/449 |
| 5,345,207 | 9/1994 | Gebele | 335/298 |

*Primary Examiner*—David K. Moore
*Assistant Examiner*—Michael R. Cammarata
*Attorney, Agent, or Firm*—R. Hutter

[57] ABSTRACT

A write head magnetizes magnetic-ink characters for a MICR system. A magnetic assembly defines a first pole in a first location and an opposite pole in a second location. A first pole piece and a second pole piece, spaced by a gap therebetween, are provided, the first pole piece disposed adjacent the first location and adapted to conduct a magnetic field from the first pole to the gap. A selectably positionable member is disposed between the second location and the second pole piece, the positionable member being adapted to affect a magnetic field from the second location through the second pole piece to the gap, thereby facilitating selectable alteration of a magnetic field profile across the gap.

4 Claims, 4 Drawing Sheets

WRITE HEAD FOR A MICR READER HAVING AN ADJUSTABLE FIELD PROFILE

The present invention relates generally to improvements in apparatus and methods for recognizing characters printed in magnetic ink on documents, and more particularly, to improvements in write heads for such apparatus.

The automated recognition of characters printed in magnetic ink on documents of various types and for various purposes is well-known. It is now common practice among banking institutions to provide customers with checks that have been imprinted with a customer identification number in magnetic ink so that the checks can be rapidly sorted by machine. Checks received by the bank are passed through a magnetic ink character recognition (MICR) system which provides electrical signals to a computer which operates sorting apparatus. An example of a magnetic character recognition system is disclosed in U.S. Pat. No. 3,638,238, the teachings of which are hereby incorporated by reference.

In general such systems include a write head having a permanent magnet and pole pieces curving toward each other from the poles of the magnet to form a gap. A magnetic field is formed across the gap, and characters on a document are magnetized by passing the document across the gap. The document is then passed across a read head which senses changes in magnetic flux caused by the motion of the magnetized characters relative to the read head. The read head thus generates electrical signals that can be decoded by appropriate circuitry for transmission to a computer.

U.S. Pat. No. 4,922,086 discloses an improved design of a MICR reader which exploits the discovery that an asymmetrical magnetic profile in the write head portion of the reader does a particularly effective job of magnetizing the MICR characters so that they may be more reliably read by the read head. In particular, the magnetic field of the write head should be larger at the leading side of the write head, where the document bearing magnetic characters enters the field, than at the trailing side of the write head. In a preferred embodiment of this invention, the peak value of the normal component of the magnetic induction on the leading side is from 450 to 650 gauss, while the peak value at the trailing side is in the range from 200 gauss to 340 gauss. In brief, this asymmetry prevents the pole effects on the leading and trailing edges of the head from canceling each other out on a character moving across the head. In this way, more of a magnetic trace will be left on the MICR character as the document moves to the read head.

It is known that certain write heads on equipment made by Unisys ® are arranged to provide two like magnetic poles across the gap thereof, to create repelling forces.

Beyond the basic insight that an asymmetrical profile of the magnetic field in the write head enhances the performance of a MICR reader, in practical terms it has been found that subtle variations in the magnetic field profile may have a significant effect on the ultimate reject rate of a set of MICR documents, and that there may exist, for a given situation, an optimum magnetic field profile which will enable a maximum proportion of a set of MICR documents to be read successfully. The present invention proposes a MICR reader in which the write head is precisely adjustable to optimize the performance for a given situation.

According to the present invention, there is provided a write head for a magnetic-character recognition system. A magnetic assembly defines a first pole in a first location and a second pole, of a polarity opposite the first pole, in a second location. A first pole piece and a second pole piece, spaced by a gap therebetween, are provided, the first pole piece disposed adjacent the first location and adapted to conduct a magnetic field from the first pole to the gap. A selectably positionable member is disposed between the second location and the second pole piece, the positionable member being adapted to affect a magnetic field from the second location through the second pole piece to the gap, thereby facilitating selectable alteration of a magnetic field profile across the gap.

Figure 6:
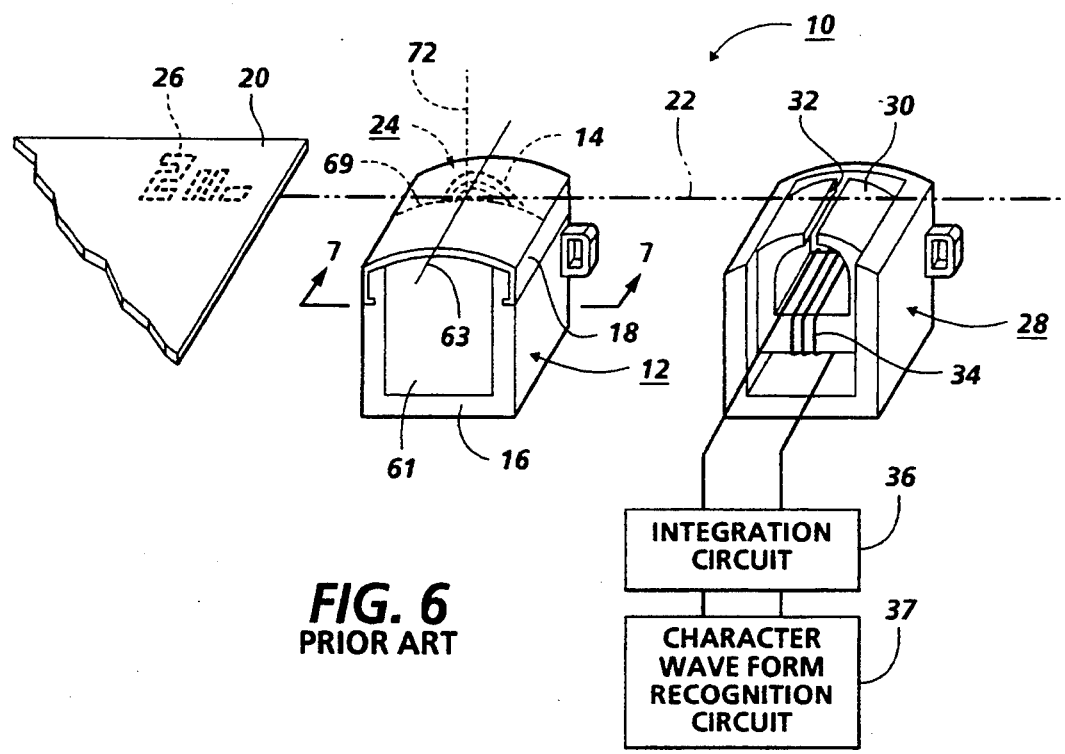
FIG. 6 is a perspective view showing the basic elements of a MICR reader including a write head.
Figure 7:
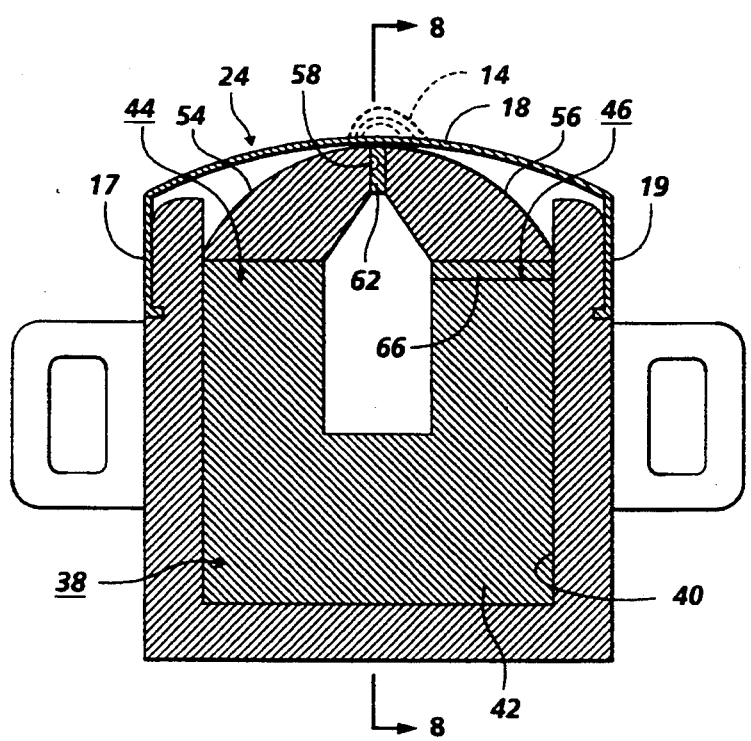
FIG. 7 is a sectional elevational view of a write head magnetized in accordance with the present invention taken along line 7—7 of FIG. 6 in the direction of the arrows.
Figure 8:
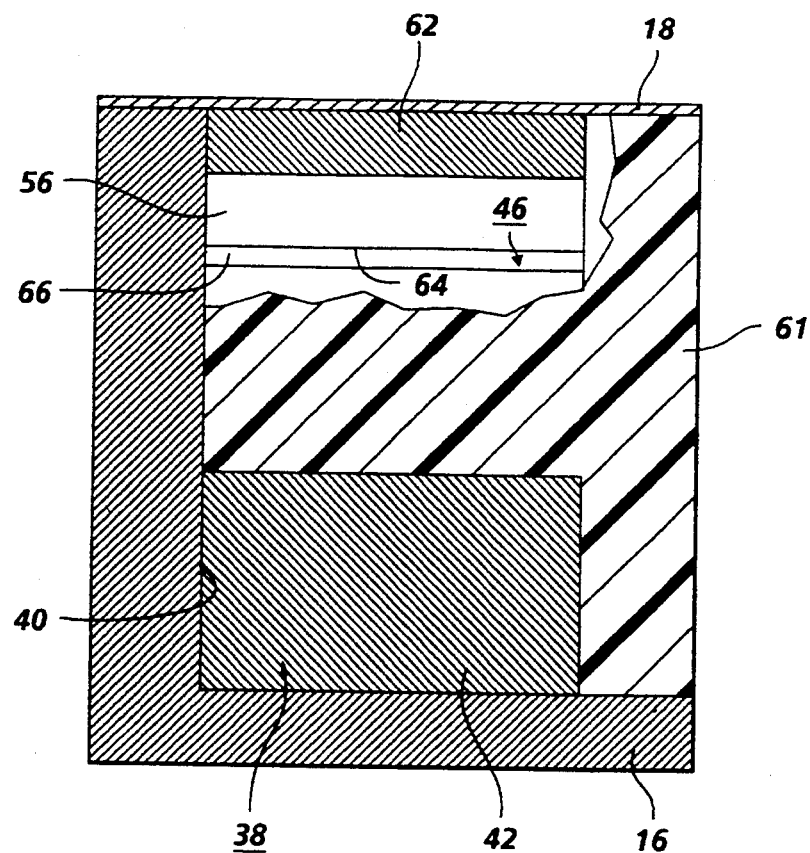
FIG. 8 is a cross section of the write head of FIG. 7 taken along line 8—8 of FIG. 7 in the direction of the arrows.

Referring now to the drawings, and more particularly to FIGS. 6 through 8, shown therein and designated by the general reference numeral 10 is a character recognition system constructed in accordance with the present invention to include a write head 12 that produces an asymmetric magnetic field as indicated by magnetic lines of force illustrated in dashed lines at 14 of FIG. 6 and FIG. 7. (For purposes of illustration, the magnetic lines of force have been exaggerated in FIG. 6.)

As shown in the drawings, the write head comprises a case 16, constructed of a nonmagnetic alloy, and is surmounted by a curved, stainless steel cap 18 that can be positioned to engage a document 20 that is moved through the system 10 along a document travel path indicated in dot-dash line at 22 in FIG. 6. The upper surface 24 of the cap 18 thus forms a document engagement surface for the write head 12 that intersects the document travel path 22 and positions the document with respect to the magnetic field 14 in a manner to be discussed below. As indicated in FIGS. 7 and 8, the cap 18 can be secured to the case 16 by bending portions 17 and 19 at opposite edges of the cap 18 about upper portions of the case 16 and bending the portions 17 and 19 to form flanges received in grooves cut in two opposite sides of the case 16.

MICR characters 26, illustrated in dashed lines in FIG. 6, are imprinted on the side of the document 20 that contacts the document engagement surface 24 (the underside of the document 20 in FIG. 6) so that passage of the document across the write head 12 will magnetize the characters 26. The system 10 further comprises a conventional read head 28 in which is located a substantially toroidal iron core 30. The core 30 is interrupted by a gap 32 adjacent the document travel path 22 so that passage of magnetized characters by the read head 28 will produce a changing magnetic flux in the core 30. (For purposes of illustration, the width of the gap 32 has been exaggerated in FIG. 6.) A coil 34 is wrapped about a portion of the core so that electrical signals indicative of the characters on the document 20 will be generated in the coil 34 in response to variations in the magnetic flux in the core 30. The coil 34 is electrically connected to a conventional integrating circuit 36 that receives signals induced in the coil 34 and produces signals substantially proportional to the magnetization of characters passing the gap 32. The output of the integrating circuit 36, in turn,-is electrically connected to a conventional character waveform recognition circuit 37 for determining the sequence of characters on a document from the signals produced by the integrating circuit. A suitable integrating circuit and character waveform recognition circuit for use in the present invention has been disclosed in the above referenced U.S. Pat. No. 3,638,238.

The write head 12 further comprises a magnet assembly 38 disposed in a cavity 40 formed in the case 16. The magnet assembly 38, in turn, typically comprises a C-shaped permanent magnet 42 which is magnetized such that opposite magnetic poles exist at the ends 44 and 46 of the C of the magnet 42. It may also be possible to construct a magnet assembly comprising a plurality of permanent magnets with a equivalent effect on the magnetic field as the single C-shaped magnet 42.

The write head 12 further comprises two soft iron pole pieces 54 and 56 that are positioned atop the ends 44 and 46 of the magnet 42 respectively, the pole pieces 54 and 56 curving upwardly to juxtaposed ends (not numerically designated in the drawings) that form a primary gap 58 immediately below central portions of the cap 18. Portions of the pole pieces 54 and 56 adjacent the juxtaposed ends extend along the underside of the cap 18. The primary gap 58 is preferably of a predetermined spacing between pole pieces, the thickness being fixable by a piece 62 of brass shim stock positioned in the gap 58. Thus, the magnet assembly produces the magnetic field 14 which extends through the cap 18 to curve over central portions thereof between the ends of the pole pieces 54 and 56. As shown particularly in FIG. 8, spaces within the case 16 about the magnet assembly can be filled with a suitable potting compound 61 to fix the magnet assembly in the case 16.

Figure 9:
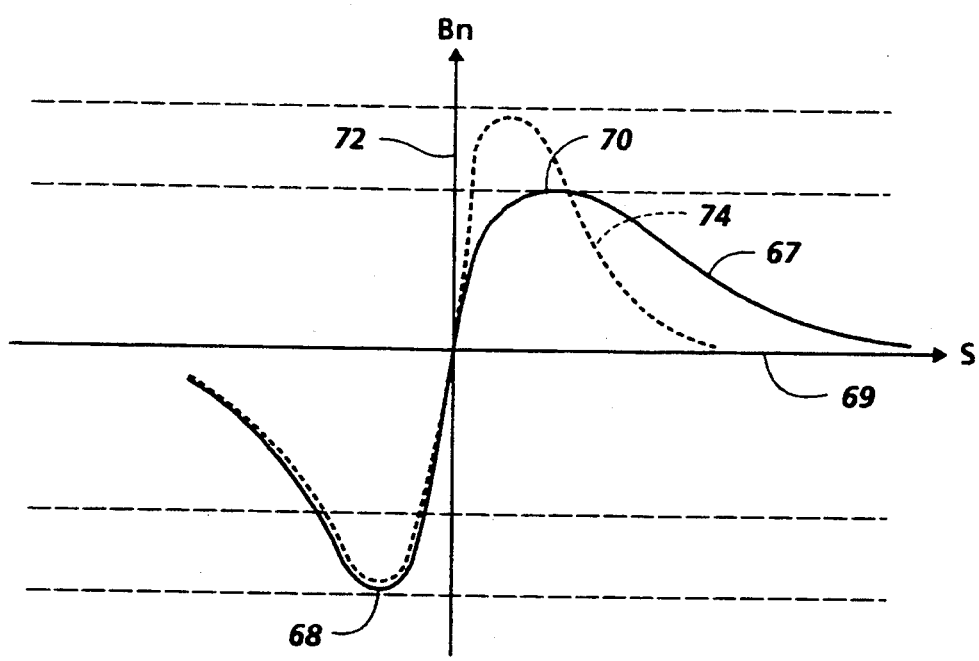
FIG. 9 is a graphical representation of an asymmetrical magnetic field produced by a write head magnetized in accordance with the present invention.

As noted above, it has been found that an asymmetry in the magnetic field produced by the write head 12 along the document travel path 22 enhances the discrimination of different magnetic characters by the system 10, permitting xerographically produced characters to be distinguished thereby. Such asymmetry is schematically illustrated in FIG. 9 which presents a graph 67 of the component of the magnetic induction normal to the document engagement surface 24 along an arc, indicated in dashed line at 69 in FIG. 6, of the surface 24 extending substantially parallel to the document travel path 22. In particular, the normal component $B_n$ at the surface 24 has been plotted as the ordinate in FIG. 9 and arc length S along the line 69 has been plotted as the abscissa with the origin of the graph being a point on the null line 63.

As shown in FIG. 9, the magnetic induction on the leading side of the write head 12 (the side to the left of the null line 63 in FIG. 6 and to the left of the origin in FIG. 9) is generally directed perpendicularly to the document engagement surface 24 and, in the practice of the invention, the component thereof normal to the document engagement surface 24 has a peak value, indicated at 68 in FIG. 9, in the range from 450 to 650 gauss. At the origin, the magnetic induction is parallel to the document engagement surface 24 so that the normal component of the magnetic induction at the origin of coordinates in FIG. 9 is zero. The normal component of the magnetic induction at the document engagement surface exhibits a second peak 70 on the trailing side of the write head 12; that is, the side to the right of the null line 63 in FIG. 6, as the magnetic induction again becomes directed substantially normal to the document engagement surface 24. The peak 70 is caused to have a value in the range from 200 to 340 gauss and the normal component of the magnetic induction is caused to have an algebraic sign at the peak 70 that is opposite the algebraic sign of the normal component of the magnetic induction at the peak 68. Thus, for the one preferred embodiment of the write head 12 that has been described above, the sign the normal component of the magnetic induction on the leading side of the null line 63 and with respect to a coordinate system wherein the axis 72 extends along the outward normal to the document engagement surface 24 as shown for the center of the arc 69 in FIG. 6 and by the labeling of the axes in FIG. 9, the normal component of the magnetic induction is negative at the peak 68 and positive at the peak 70. Further, for such embodiment, the peaks 68 and 70 occur at positions displaced substantially one sixteenths inch to the sides of the null line. For purposes of comparison, a typical magnetic profile for a conventional write head has been indicated in dashed line at 74 in FIG. 9.

Having explained the general function of a write head in a MICR reader, and the prior-art improvement of providing an asymmetrical magnetic field in the write head, attention is directed to FIGS. 1–5, which show a variety of possible designs of a write head 12 which may produce a magnetic field of an optimum profile for best performance. Each embodiment in FIGS. 1–4 is shown as having a selectably-positionable shunt 100 disposed at the interface between one pole of magnet 42 and pole piece 56. The purpose of shunt 100 is to create the necessary disruption in the symmetry of the magnetic field around the gap 58. The present invention proposes that shunt 100 be provided adjacent one pole piece and mounted in a movable fashion so that the precise position of the shunt is adjustable, thereby facilitating subtle distortions of the magnetic field created across the gap. Such a shunt may operate either by slightly varying the position of the pole piece 56 relative to the gap 58, or alternately by changing the behavior of one of the poles of the magnet 42 forming the bulk of the write head. In each illustrated case, the write head comprises a main magnet 42, having at the poles thereof pole pieces 54 and 56, defining a gap 58 therebetween. In one prior-art device, disclosed in U.S. Pat. No. 4,922,086, this asymmetry is provided by a shim of non-magnetic material, such as indicated by 66 in FIG. 7; this shim operates by attenuating magnetic flux on one side of the gap 58. In the examples of FIGS. 1–4, the shunt 100 is preferably made of a magnetically-permeable substance, such as steel, to permit selective redirection of magnetic lines of force therethrough. In each case the direction of possible motion of the shunt 100 is shown by an arrow thereon.

Figure 1:
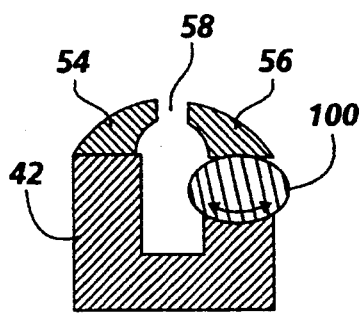
FIG. 1 is a sectional elevational view of a write head representing one embodiment of the present invention.

In FIG. 1, the shunt is rotatable about an axis, and defines an eccentric profile so that rotation of the shunt in the direction of the arrows will vary the precise position of pole piece 56, thereby disrupting the symmetry of a magnetic field across gap 58.

Figure 2:
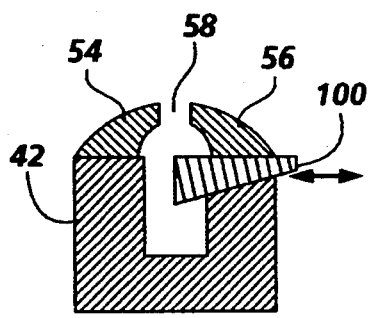
FIG. 2 is a sectional elevational view of a write head representing another embodiment of the present invention.

In FIG. 2, the shunt 100 is of a wedge shape, having a sloped surface which interacts with a complementary surface on magnet 42. Adjustment of the position of the shunt along the direction of the arrows varies the precise position of pole piece 56.

Figure 3:
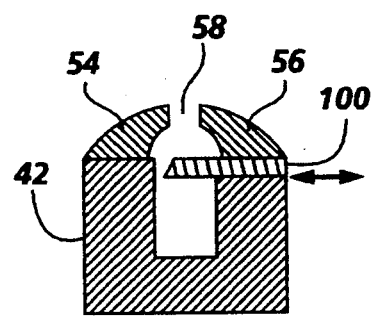
FIG. 3 is a sectional elevational view of a write head representing another embodiment of the present invention.

FIG. 3 shows an arrangement whereby the shunt 100 is designed to extend a given distance from one leg of magnet 42 to the other. The precise position of the shunt extending along side the gap 58 causes a certain quantity of the magnetic flux from the magnet 42 to be "shorted" away from the gap 58, creating the desired asymmetry. The exact amount of redirection of the magnetic lines of force, and thus the exact profile of the magnetic field across the gap, will depend on the precise position of the shunt.

Figure 4:
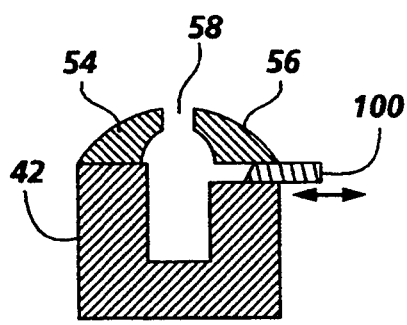
FIG. 4 is a sectional elevational view of a write head representing another embodiment of the present invention.

Similarly, in FIG. 4, the shunt 100 is movable generally away from the gap 58, to draw away a portion of the magnetic field on the side having the shunt, for the desired asymmetry.

By varying the position of either the pole piece 56 (as in FIG. 1 and FIG. 2) or the configuration of the magnetic field across the gap 58 (as in FIG. 3 and FIG. 4), the effect is to disrupt the symmetry of the magnetic field across the gap 58.

Figure 5:
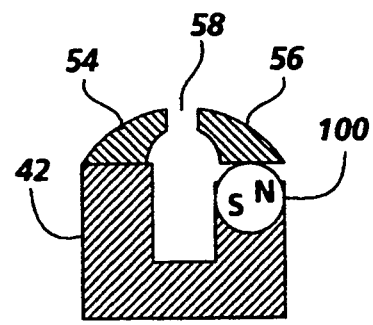
FIG. 5 is a sectional elevational view of a write head representing another embodiment of the present invention.

FIG. 5 shows another embodiment of the present invention, comprising a rotatable cylindrical magnet 110 having poles, as shown, disposed around the circumference thereof. By rotating the cylindrical magnet 110, a certain quantity of the magnetic flux from the magnet 42 will be, in effect, counteracted by a component of an opposite pole from the cylindrical magnet 110. As shown, if the north pole of magnet 42 is adjacent pole piece 56, and the cylindrical magnet 110 is positioned so that some component of the north pole of the cylindrical magnet 110 is against the north pole of magnet 42, the total magnetic flux from the combined north pole of magnet 42 and cylindrical magnet 110 will be slightly less than the corresponding south pole of magnet 42. In this way, by adjusting the rotational position of the cylindrical magnet 110, the total magnetic flux through pole piece 56 can be fairly precisely adjusted, to obtain an optimal magnetic field profile across the gap 58.

Figure 10:
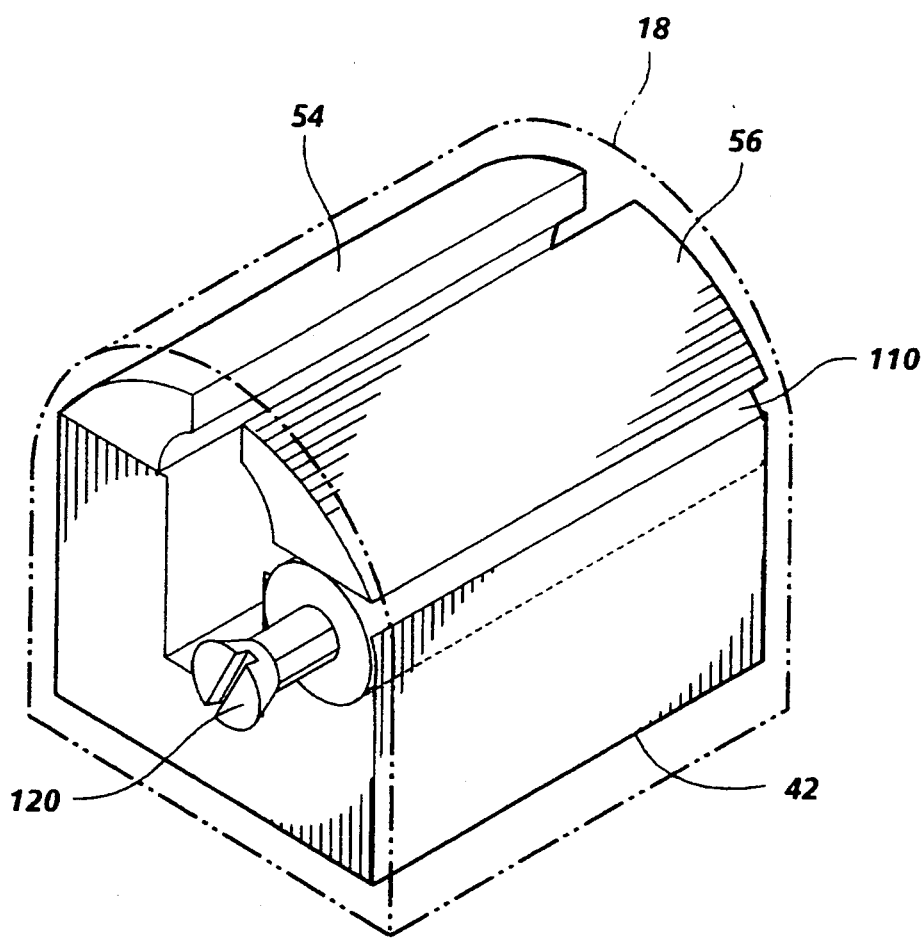
FIG. 10 is a perspective view of certain elements of one embodiment of a write head according to the present invention.

For each case FIGS. 1–5, it is intended that the adjustment of the position of the shunt 100 or rotatable magnet 110 be in the nature of an occasional "tweaking" to obtain optimum performance. FIG. 10 is a perspective view of certain portions of a write head 12 which may be externally adjusted. Where the shunt or cylindrical magnet (shown in the Figure as 110) is rotatable about an axis, the shunt or rotatable magnet may be adjusted by dial means, such as screw head 120, accessible from the exterior of the write head. In the cases where the shunt 100 is laterally positionable, the shunt 100 may conceivably be attached to an arrangement where the position of the shunt 100 may be precisely modified by turning of the dial means such as the screw head, as would be familiar to a person skilled in the art.

While the invention has been described with reference to the structure disclosed, it is not confined to the details set forth, but is intended to cover such modifications or changes as may come within the scope of the following claims.

We claim:

1. A write head for a magnetic-character recognition system, comprising:
    a magnetic assembly including a first magnetic pole in a first location and a second magnetic pole in a second location with the second magnetic pole being of an opposite polarity to the first magnetic pole;
    a first pole piece and a second pole piece, the first pole piece and the second pole piece defining a gap therebetween, the first pole piece disposed adjacent the first location and conductive of magnetic flux from the first pole to the gap; and
    a selectably positionable member disposed between the second location and the second pole piece, the positionable member being adapted to affect magnetic flux from the second location through the second pole piece to the gap, thereby facilitating selectable alteration of a magnetic field profile across the gap, the positionable member being of a wedge shape interacting with a surface on the magnetic assembly adjacent the second magnetic pole, and being movable so that adjustment of the position of the positionable member causes an alteration of a position of the second pole piece relative to the gap.

2. The write head of claim 1, wherein the positionable member comprises a magnetic material.

3. The write head of claim 1, further comprising dial means accessible from an exterior surface of the write head, the dial means being operatively associated with the positionable member for selective positioning thereof.

4. A write head for a magnetic-character recognition system, comprising:
    a magnetic assembly including a first magnetic pole in a first location and a second magnetic pole in a second location with the second magnetic pole being of an opposite polarity to the first magnetic pole;
    a first pole piece and a second pole piece, the first pole piece and the second pole piece defining a gap therebetween, the first pole piece disposed adjacent the first location and conductive of magnetic flux from the first pole to the gap; and
    a selectably positionable member disposed between the second location and the second pole piece, the positionable member being adapted to affect magnetic flux from the second location through the second pole piece to the gap, thereby facilitating selectable alteration of a magnetic field profile across the gap, the positionable member being of an eccentric shape interacting with a surface on the magnetic assembly adjacent the second magnetic pole, and being rotatable so that adjustment of the position of the positionable member causes an alteration of a position of the second pole piece relative to the gap.

* * * * *